(12) United States Patent
Metternich

(10) Patent No.: US 11,345,197 B2
(45) Date of Patent: May 31, 2022

(54) DIRT PROTECTION COVER ARRANGEMENT, DIRT PROTECTION COVER DEVICE FOR SAID ARRANGEMENT, AND COUPLING METHOD INVOLVING SAME

(71) Applicant: Hamburger Patent Schmiede GmbH, Buchholz (DE)

(72) Inventor: Heinz-Ruediger Metternich, Eversen-Heide (DE)

(73) Assignee: Hamburger Patent Schmiede GmbH, Buchholz (DE)

( * ) Notice: Subject to any disclaimer, the term of this patent is extended or adjusted under 35 U.S.C. 154(b) by 414 days.

(21) Appl. No.: 16/490,584

(22) PCT Filed: Jan. 18, 2018

(86) PCT No.: PCT/DE2018/100042
§ 371 (c)(1),
(2) Date: Sep. 2, 2019

(87) PCT Pub. No.: WO2018/161987
PCT Pub. Date: Sep. 13, 2018

(65) Prior Publication Data
US 2020/0001669 A1    Jan. 2, 2020

(30) Foreign Application Priority Data

Mar. 9, 2017   (DE) ............... 20 2017 101 339.1

(51) Int. Cl.
*B60D 1/01*   (2006.01)
*B60D 1/60*   (2006.01)
(Continued)

(52) U.S. Cl.
CPC ............. *B60D 1/015* (2013.01); *B60D 1/605* (2013.01); *B60D 1/64* (2013.01); *B60G 17/04* (2013.01); *B62D 53/0842* (2013.01); *B62D 53/12* (2013.01)

(58) Field of Classification Search
CPC .......... B60D 1/015; B60D 1/60; B60D 1/605; B60D 1/64; B62D 53/08; B62D 53/0842; B62D 53/12
See application file for complete search history.

(56) References Cited

U.S. PATENT DOCUMENTS 6,709,001 B1    3/2004   Morgan et al.
2002/0190497 A1  12/2002  Metternich
(Continued)

FOREIGN PATENT DOCUMENTS

DE         60102393 T2    2/2005
DE      102006033899 A1   1/2008
(Continued)

OTHER PUBLICATIONS

International Search Report dated Apr. 23, 2018, in International Application No. PCT/DE2018/100042.
(Continued)

*Primary Examiner* — Minnah L Seoh
*Assistant Examiner* — Maurice L Williams
(74) *Attorney, Agent, or Firm* — Patent Central LLC; Stephan A. Pendorf

(57) ABSTRACT

A dirt protection cover arrangement with a semi-trailer (2) and a towing vehicle (3), for closing a hollow-bored king pin (21) on the semi-trailer (2) for an automatic fifth-wheel coupling, the king pin (21) being arranged on the underside (20) of the semi-trailer (2) as a counter-bearing for a fifth wheel (31) of the towing vehicle (3), a dirt protection cover device (1) being arranged such that it is adjacent to the
(Continued)

Figure 1:
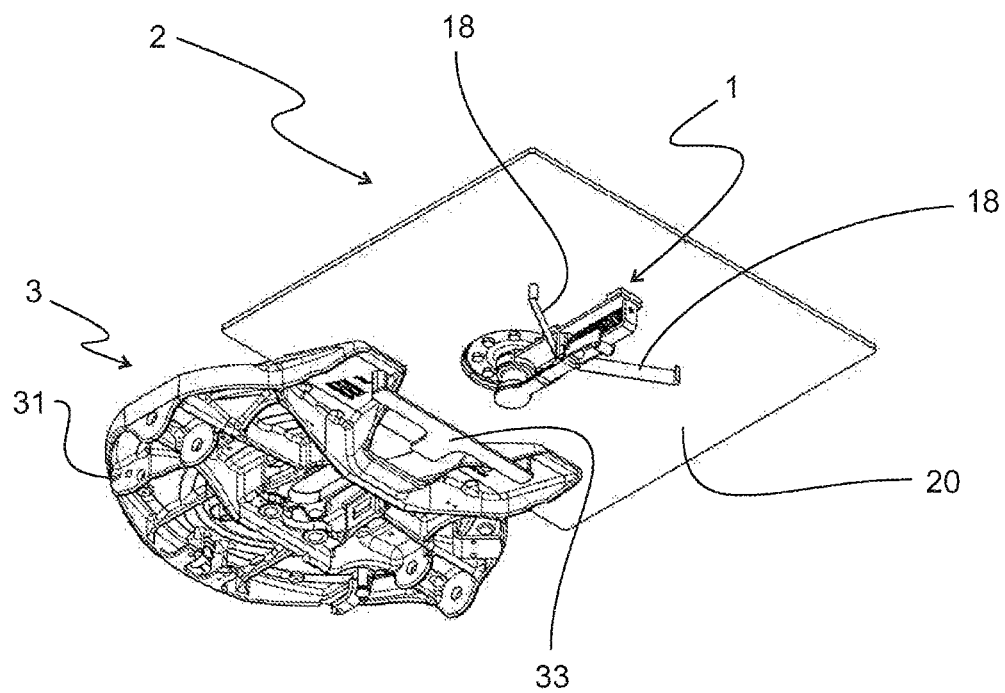

underside (20) of the semi-trailer (2) and can rotate about the king pin (21), said dirt protection cover device including a dirt protection cover (11) for covering the borehole (22) in the king pin (21), and the dirt protection cover (11) being configured on the dirt protection cover device (1) such that, during the coupling process, it can be displaced from a base position covering the borehole (22) in the king pin (21) into a coupled position exposing the borehole. Also, a dirt protection cover device (1) for a dirt protection cover arrangement, and a coupling method involving same.

14 Claims, 2 Drawing Sheets

(51) Int. Cl.
*B60D 1/64* (2006.01)
*B60G 17/04* (2006.01)
*B62D 53/08* (2006.01)
*B62D 53/12* (2006.01)

(56) References Cited

U.S. PATENT DOCUMENTS

| | | |
|---|---|---|
| 2009/0267321 A1 | 10/2009 | Alguera et al. |
| 2010/0059967 A1 | 3/2010 | Alguera et al. |
| 2016/0075197 A1* | 3/2016 | Coleman ............ B62D 53/0864 280/433 |
| 2021/0260944 A1* | 8/2021 | Metternich ............ B62D 53/08 |

FOREIGN PATENT DOCUMENTS

| | | |
|---|---|---|
| DE | 102008001349 A1 | 11/2009 |
| DE | 202016102707 U1 | 7/2016 |
| EP | 1240067 B1 | 4/2003 |

OTHER PUBLICATIONS

German Search Report dated Sep. 15, 2017, in German Application No. 20 2017 101 339.1.

* cited by examiner

DIRT PROTECTION COVER ARRANGEMENT, DIRT PROTECTION COVER DEVICE FOR SAID ARRANGEMENT, AND COUPLING METHOD INVOLVING SAME

The invention relates to a dirt protection cover assembly with a semi-trailer and a towing vehicle for closing a hollow-bored king pin on the semi-trailer, in particular for an automatic fifth wheel, wherein the king pin serving as a counter-bearing for a fifth wheel of the towing vehicle is arranged on the underside of the semi-trailer. Furthermore, the invention relates to a dirt protection cover device for this arrangement and a coupling method involving same.

In road freight, transport of goods with so-called towing vehicle-trailers has prevailed. This is a combination of a towing vehicle with a fifth wheel and a semi-trailer, which receives the cargo, resting with part of its weight on the fifth wheel of the towing vehicle. The connection between towing vehicle and semi-trailer is achieved via a so-called fifth wheel semi-trailer coupling. For this purpose, a king pin is arranged on the semi-trailer pointing down orthogonally from the underside of the semi-trailer serving as the counter-bearing to the fifth wheel of the towing vehicle. Since the fifth wheel semi-trailer coupling is thus arranged on a road-facing underside of the semi-trailer usually directly over the rear axle or axles of the towing vehicle, the fifth wheel is exposed to heavy soiling.

Furthermore, there have been recent developments for the automation of the fifth wheel, especially for the automatic connection of electrical lines and brake air lines to the semi-trailer, wherein upon the mechanical latching of the plate claw arranged on the fifth wheel to the king pin, these engage via corresponding connectors in an axial bore in the king pin, as described in EP 1 240 067 B1. Once the semi-trailer is coupled to a hollow-drilled king pin in a corresponding automatic clutch, dirt entry into the delicate interior of this additional electrical-conductor and brake-air contact is precluded. However, such a semi-trailer can become dirt in the uncoupled state, for example when it is parked. A much greater soiling is to be assumed in a coupling of a semi-trailer of this type with a towing vehicle without an automatic coupling system, since the hollow bore with the sensitive contacts therein is freely exposed to environmental influences. In particular, for the second case of a coupling of a towing vehicle without automatic connection of the electrical and pneumatic lines, the stirring up of dirt, etc. during driving also significantly contributes to soiling and particularly in the hollow bore of the king pin of the semi-trailer.

Further, it is known to put cap or cup-shaped elements on the king pin and to lock these to prevent the unauthorized coupling of a towing vehicle to a parked semi-trailer. Coupling is then only possible when an authorized person removes this cap with the associated lock. Incidentally, the king pin for parked semi-trailers is protected from contamination. However, during driving this cover is not mounted on the king pin and thus cannot prevent contamination of the hollowed king pin.

The object of the invention is thus to reliably protect the delicate insides of a hollow-drilled king pin from contamination.

This object is achieved with a dirt protection cover arrangement according to claim 1, a related dirt protection cover device for said arrangement, and a coupling method according to claim 11.

By providing a dirt protection cover device on the underside of the semi-trailer arranged adjacent to and rotatable about the king pin, which has a dirt protection cover formed on the dirt protection cover device to cover the hole provided therein, the dirt protection cover during the coupling process displaceable from a basic position of covering a hole in the king pin to a coupled position freeing the bore, the hole in the king pin can be protected by the dirt protection cover in the uncoupled state of the semi-trailer, the dirt protection cover automatically freeing for coupling during the coupling operation the electrical and pneumatic connections located in the king pin. If the semi-trailer with dirt protection cover device is coupled to a towing vehicle without automatic fifth wheel, the dirt protection cover remains in its protective position, covering the hole in the king pin. Consequently, then, dirt whirled up during travel can not penetrate into the bore and thus the delicate contacts, etc. of the king pin. Since the dirt protection cover device on the underside of the semi-trailer has mobility, namely rotatability around the king pin, it does not disturb the mobility of the fifth wheel between towing vehicle and semi-trailer, regardless of whether the towing vehicle is equipped with an automatic fifth wheel or not.

In order to reliably accomplish the opening and closing of the dirt protection cover, the dirt protection cover device has a lateral guide with a thrust element for moving the dirt protection cover, wherein the thrust element is designed to be movable in the radial direction of the king pin, parallel to the underside of the semi-trailer, and coupled to the dirt protection cover.

Preferably, a driver is provided on the thrust element, which is formed to be taken along during the coupling process by an actuating means provided on the fifth wheel of the engaging towing vehicle, wherein only towing vehicles with automatic fifth wheel have this actuating means on the fifth wheel plate. Thereby it is achieved in a mechanically simple manner that the thrust element and thus the cover is laterally displaced when the fifth wheel of the towing vehicle approaching the king pin has an actuating means, that is, has an automatic fifth wheel. Otherwise, the dirt protection cover remains on the king pin.

In order to ensure a safe reclosing of the dirt protection cover device after disconnecting the towing vehicle from the semi-trailer, a first spring is provided in the lateral guide, which first spring maintains the thrust element biased in the basic position in the direction of covering the bore in the king pin.

If a second spring is provided on the thrust element, whereby the dirt protection cover is biased by this second spring in the axial direction on the free end face of the king pin, a sufficient contact pressure of the dirt protection cover on the front side of the king pin is ensured by this second spring. In addition, the inside of the dirt protection cover may have a sealing, rubberized coating, so that a dirt entry, as well as substantially also moisture, are excluded from the bore of the king pin.

If the dirt protection cover device has a width which is smaller than the width of the insertion slot of the fifth wheel, the dirt protection cover device fits between within the insertion slot of the fifth wheel plate, so that the transmission of movement for the dirt protection cover can be made as short a stroke as possible. Further, it is preferable that the construction height of the dirt protection cover device is less than or equal to the height of the king pin. It is only necessary to ensure that the dirt protection cover can easily slide onto and off of the end face of the king pin. Of course, it may be necessary that the driver of the dirt protection cover device exceeds the previously defined maximum width and/or maximum height, so that it can be actuated during the coupling operation of the fifth wheel plate or an element arranged thereon.

So that the dirt protection cover device centers in the insertion slot of the fifth wheel as quickly as possible during the coupling operation, the dirt protection cover device in the installed condition is flanked on both sides with arrow-shaped splayed leaf springs on both sides of its side flanks.

Since the king pin has a cylindrically symmetrical king pin body protruding down from the underside of the semi-trailer, wherein a guide groove is provided in the part of the king pin body near the underside, in which the dirt protection cover device is supported rotatably around the king pin, the technical issue of attachment of the dirt protection cover device on the king pin while ensuring the rotation around this king pin easy solved. This part of the king pin body can easily tolerate a small guide groove or several circumferential guide grooves even with regard to its required stability. In the guide groove, or in the guide grooves, corresponding support means are then arranged on the dirt protection cover device, so that the dirt protection cover device with the mounted support means fixedly mounted in the guide is freely rotatable about the king pin on the underside of the semi-trailer.

It is crucial that the dirt protection cover device arranged at the king pin of a semi-trailer is freely rotatable relative thereto. Accordingly, such semi-trailers can be coupled by towing vehicles with fifth wheel in the usual way. The dirt protection cover device rotatable about the king pin disturbs neither the coupling operation nor the free rotation of the fifth wheel connection, thus forming no restriction on the functionality of the towing vehicle.

If the towing vehicle does not have an automatic fifth wheel with electrical and pneumatic contacts via a plug-in connection in the bore of the king pin, in this case, the fifth wheel of the towing vehicle (tractor) will have no actuating means, so that the dirt protection cover is not removed from the king pin during the coupling operation on the semi-trailer with dirt protection cover device. The protective function of the dirt protection cover thus remains fully intact in the semi-trailer coupled with a "normal" towing vehicle. Only when a towing vehicle with fifth wheel plate has an actuating means or a corresponding component for actuating the driver, the carrier of the dirt protection cover device is laterally displaced against the force of the first spring during the coupling operation, so that the dirt protection cover is removed from the king pin and exposes the hole in the king pin for connecting the electrical and pneumatic contacts.

Hereinafter, an embodiment of the invention will be described in detail with reference to the accompanying drawings.

There is shown in:

FIG. 1 a perspective view of a fifth wheel plate and a dirt protection cover device immediately before the coupling operation, FIG. 2 a view of this situation from below and FIG. 3*a-d* a partially sectioned side view of the coupling process in four stages.

In FIG. 1, a dirt protection cover arrangement is shown in a perspective view obliquely from below. From a semi-trailer 2, for clarity, only an underside 20 is shown, at the center of which a king pin 21 is arranged with its axis extending orthogonal downwardly. The king pin 21 is better seen in a sectional view, for example in FIG. 3*a*. Further, in FIG. 1, a fifth wheel plate 31 of a towing vehicle 3, otherwise not shown, is arranged so that upon further reverse driving of the towing vehicle 3, the fifth wheel plate 31 would engage with the king pin 21 as a fifth wheel connection.

Figure 2:
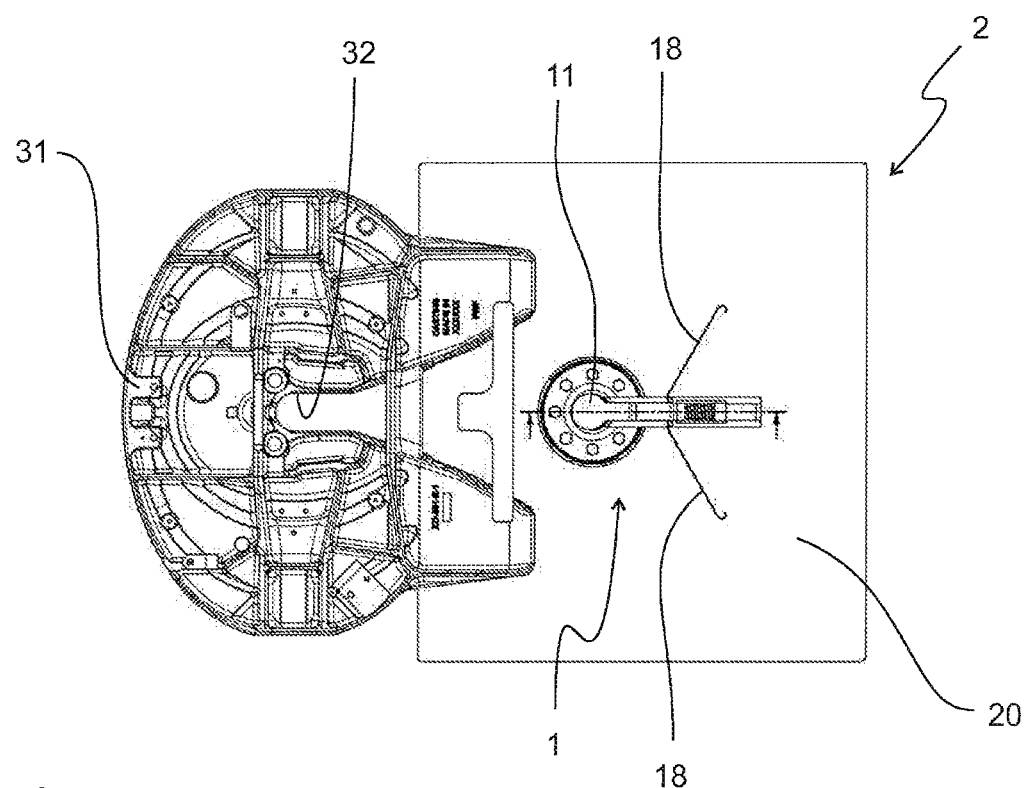

Furthermore, this situation is shown in FIG. 2 in a bottom view. In FIG. 2 an insertion slot 32 typical for saddle plates 31 can be seen, into which the king pin 21 of the semi-trailer 2 is introduced when reversing the towing vehicle 3 and at the end of the insertion slot 32 claws of the fifth wheel firmly clamp onto and coupled with it.

Figure 3A:
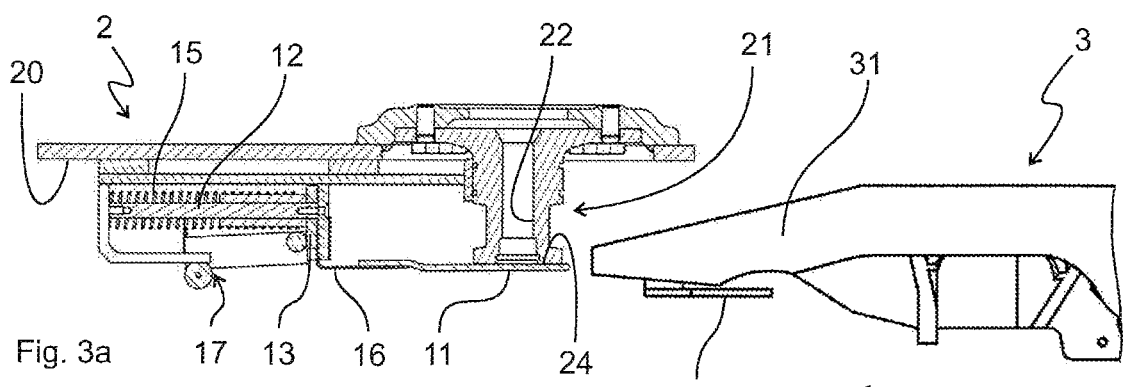

On the king pin 21, a dirt protection cover device 1 is freely rotatable about the king pin 21 and arranged adjacent to the underside 20 of the semi-trailer 2. The dirt protection cover device 1 has a dirt protection cover 11 which covers a coaxial bore 22 in the king pin 21 at its lower end face 24, as can be seen in FIGS. 1, 2 and 3*a*.

The rotatable mounting of the dirt protection cover device 1 on the king pin 21 is achieved in that the king pin 21 has a circumferential guide groove 23 located near its attachment to the underside 20 of the semi-trailer 2 materially stronger part of the king pin body and into the guide groove 23 wraparound element is attached. In the exemplary embodiment shown in FIGS. 3*a* to 3*d*, the king pin 21 thus has two circumferential guide grooves 23 at its root region of the king pin body. The wrapping element is not shown in the grooves 23 for clarity.

Furthermore, the dirt protection cover device 1 has a lateral guide 12, in which a laterally displaceable thrust element 13 is guided. On the thrust element 13 a connecting element 14 is attached, which is connected at its other end to the dirt protection cover 11. Further, a driver 17 is provided on the thrust element 13, which is mechanically actuated during the coupling operation of a component of the towing vehicle 3, in particular the fifth wheel plate 31. The thrust element 13 is provided with a first spring 15 which is formed in the embodiment shown in FIGS. 3*a* to 3*d* as a helical compression spring spring-loaded to urge to the thrust element 13 and the dirt protection cover 11 via the connecting element 14 in the closed position shown in FIG. 3*a* (basic position). Furthermore, a second spring 16 is provided which in the embodiment according to FIGS. 3*a* to 3*d* is designed as a steel strip spring which urges the dirt protection cover 11 onto the end face 24 of the king pin 21 in order to ensure that the dirt protection cover 11 rests as directly as possible on the end face 24 of king pin 11.

Furthermore, leaf springs 18 are arranged laterally spread obliquely rearwardly on the dirt protection cover device 1 in the region of the lateral guide 12 in the installed condition, as can be seen in FIGS. 1 and 2. These leaf springs 18 cooperate in the coupling operation with the initially very wide insertion slot 32 of the fifth wheel plate 31 in such a way that the dirt protection cover device 1, which is freely rotatable about the king pin 21, is kept elastically soft in the central position of the fifth wheel plate 31.

Hereinafter, the coupling operation in the dirt protection cover arrangement as described above with reference to FIGS. 3*a* to 3*d* will be described in more detail.

The situation, partly shown in cross-section, of FIG. 3*a*, shows the fifth wheel plate 31 of the towing vehicle 3 in a sectional side view. The semi-trailer 2 with its underside 20 and the attached king pin 21 and the dirt protection cover device 1 riding on the king pin 21 is shown in cross-section. In the situation according to FIG. 3*a*, the towing vehicle 3 is in the starting position before the start of the coupling process. This situation is also shown in FIGS. 1 and 2. By reversing, represented by arrow R, the fifth wheel plate 31 of the towing vehicle 3 approaches the king pin 21 of the semi-trailer 2.

Figure 3B:
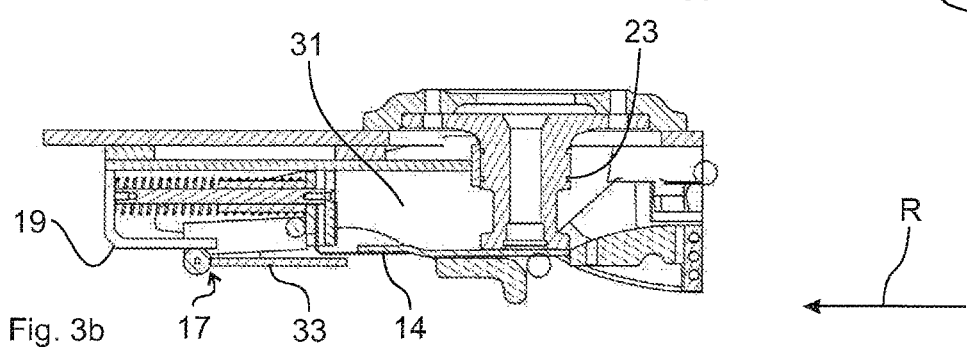

Upon further reversing according to the arrow R in FIG. 3b, the king pin 21 is received by the still wide insertion slot 32 of the fifth wheel plate 31. In FIG. 3b, only the rear half of the fifth wheel plate 31 is shown in a partial view. The fifth wheel plate 31 has an actuating means device 33, which bridges the two legs of the fifth wheel plate 31 in the region of the wide insertion slot 32 below the vertical extent of the king pin 21. This actuating device 33 thus slips unhindered by the king pin 21 and the dirt protection cover device 1 riding thereon and comes into contact with the driver 17 of the thrust element 13 of the dirt protection cover device 1.

Figure 3C:
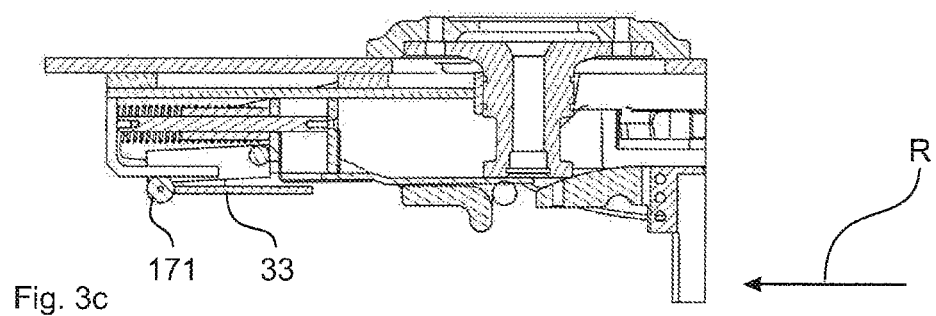

Upon further reversing R of the towing vehicle 3 as shown in FIG. 3c the driver 17 and thus the thrust element 13 is laterally displaced against the compressive force of the first spring 15 to the left in the plane of FIG. 3c, so that the dirt protection cover 11 moves the thrust element 13 to the left via the connecting element 14. In FIG. 3c, the bore 22 of the king pin 21 is already half uncovered from the dirt protection cover 11. Further, in FIG. 3c, a component of the automatic coupling arranged on the fifth wheel plate 31 of the towing vehicle 3 is shown in a cross-sectional view below the king pin 21 from the dirt protection cover 11. This component is displaced, in further reversing R of the towing vehicle 3, to the final execution of the coupling operation by enclosing the king pin 21 by means of the usual locking claws (not separately shown here as components with reference numerals) directly under the king pin 21 and centered under resilient pressure below the end face 24 of the king pin 21, so that the lifting cup located therein can introduce the therein guided plug into the contacts in the bore 22 of the king pin 21.

Figure 3D:
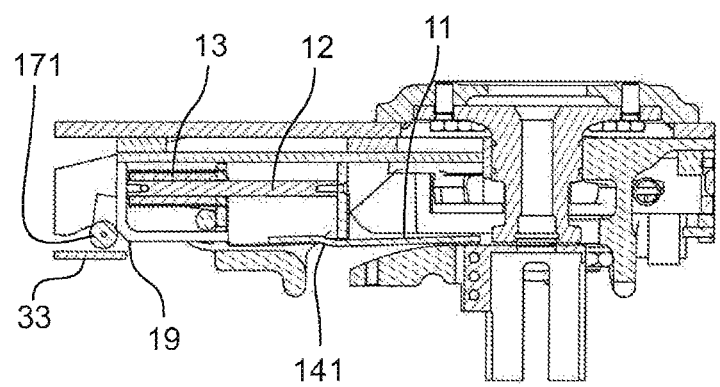

During the movement from the situation according to FIG. 3c to FIG. 3d, the actuating means 33 moves the driver 17 further to the left in the drawing direction until the driver 17 reaches its end position and is lifted around a roller guide 19, so that the actuating means 33 can slip past the end of the driver 17 formed as a roller 171. However, the actuating means 33 remains, in the coupled position of the fifth wheel, below the roller of the driver 17, as can be seen in FIG. 3d. Thus, the dirt protection cover 11, which has now fully released the end face 24 and thus the bore 22 of the king pin 21, does not slip back into its closed position.

When uncoupling, the entire process takes place in the reverse order. It should be noted that by providing a small bend 141 in the connecting element 14 the dirt protection cover 11 is slightly raised against the second spring 16 (steel strip spring) and lifted and displaced from its retracted position of FIG. 3d into its positions shown in FIGS. 3a to 3c on the end face 24 of the king pin 21. In this case, the return movement of the thrust element 13 with the attached dirt protection cover 11 occurs by relaxing the first spring 15 from the compressed position shown in FIG. 3d into the position shown in FIGS. 3a and 3b, wherein the roller 171 of the driver 17, after retraction the saddle plate 31 with the actuating means 33, returns to the position shown in FIGS. 3c to 3a after its release via the roller guide 19.

LIST OF REFERENCE NUMBERS 1 dirt protection cover device
11 dirt protection cover
12 lateral guide
13 thrust element
14 connecting element
141 bend
15 first spring
16 second spring
17 drive pin
171 roller
18 leaf spring
19 roller guide
2 semi-trailer
20 underside
21 king pin
22 borehole
23 groove, guide groove
24 front side
3 towing vehicle
31 fifth wheel
32 insertion slot
33 actuator
R reverse drive

The invention claimed is:

1. A dirt protection cover arrangement with a semi-trailer (2) and a towing vehicle (3), for closing a hollow-bored king pin (21) on the semi-trailer (2) for an automatic fifth wheel, wherein the king pin (21), serving as a counter-bearing for a fifth wheel (31) of the towing vehicle (3), is arranged on an underside (20) of the semi-trailer (2), wherein a dirt protection cover device (1) is arranged adjacent to the underside (20) of the semi-trailer (2) and rotatable about the king pin (21), wherein the dirt protection cover device (1) includes a dirt protection cover (11) for covering the bore (22) of the king pin (21) configured on the dirt protection cover device (1) such that, during a coupling process, the dirt protection cover (11) is displaceable from a basic position covering a bore (22) in the king pin (21) into a coupled position exposing the bore (22).

2. The dirt protection cover arrangement according to claim 1, wherein the dirt protection cover device (1) has a lateral guide (12) with a thrust element (13) for moving the dirt protection cover (11), wherein the thrust element (13) is configured to be movable in the direction radial to the king pin (21), parallel to the underside (20) of the semi-trailer (2), and is coupled to the dirt protection cover (11).

3. The dirt protection cover arrangement according to claim 2, wherein a drive pin (17) is provided on the thrust element (13) which is formed to be taken along during the coupling operation of the fifth wheel plate (31) by an actuator (33) of the engaging towing vehicle (3), wherein a towing vehicle (3) with automatic fifth wheel coupling is provided with this actuator (33) on the fifth wheel plate (31).

4. The dirt protection cover arrangement according to claim 3, wherein the actuator (33) on the fifth wheel plate (31) is a press pad (33) bridging an insertion slot (32), which in the installed position allows a free introduction of the king pin (21) into the insertion slot (32) and which cooperates with the drive pin (17), so that the actuator (33) during the coupling process shifts the drive pin (17) and thus the dirt protection cover (11) into the bore (22) exposing coupled position and holds it in this position against the pressure of the first spring (15).

5. The dirt protection cover arrangement according to claim 2, wherein a first spring (15) is provided in the lateral guide (12), which first spring (15) spring-biases the thrust element (13) in the direction of the basic position in which the bore (22) of the king pin (21) is covered.

6. The dirt protection cover arrangement according to claim 2, wherein a second spring (16) is provided on the thrust element (13) which second spring (16) holds the dirt protection cover (11) in the axial direction on the free end face (24) of the king pin (21).

7. The dirt protection cover arrangement according to claim 1, wherein the dirt protection cover device (1) has a width which is smaller than the width of the insertion slot (32) of the fifth wheel plate (31).

8. The dirt protection cover arrangement according to claim 7, wherein the dirt protection cover device (1) when installed has splayed leaf springs (18) on first and second sides of its flanks.

9. The dirt protection cover arrangement according to claim 1, wherein the king pin (21) has a cylindrically symmetrical king pin body protruding down from the underside (20) of the semi-trailer (2), wherein a part of the king pin body near the underside (20) is provided with a guide groove (23), in which the dirt protection cover device (1) is held rotatable around the king pin (21).

10. A dirt protection cover device (1) for a dirt protection cover arrangement according to claim 1.

11. A method for coupling a semi-trailer (2) and a towing vehicle (3), with a dirt protection cover arrangement according to claim 1, comprising
moving the towing vehicle (3) with its fifth wheel (31) backwards under the semi-trailer (2) with its king pin (21),
first, allowing the dirt protection cover device (1) during the coupling process to rotate around the king pin in such a manner that it is located in an insertion slot (32) of the fifth wheel plate (31),
during further approach of the towing vehicle (3), displacing the dirt protection cover (11) from a basic position covering the bore (22) of the king pin (21) into a position exposing the bore (22), and
completing the coupling operation.

12. The method for coupling according to claim 11, wherein the displacement of the dirt protection cover (11) during the coupling process takes place against a spring load acting in the direction of the basic position.

13. The method for coupling according to claim 11, wherein the displacement of the dirt protection cover (11) is initiated by a towing vehicle (3) with automatic fifth wheel.

14. The method for coupling according to claim 11, wherein the dirt protection cover device (1) which is freely rotatable around the king pin (21) is centered centrally to the insertion slot (32).

* * * * *